United States Patent Office 3,591,563
Patented July 6, 1971

3,591,563
ANTISTATIC PROTECTION FOR PLASTIC HAVING A PROPENSITY FOR ACCUMULATING ELECTROSTATIC CHARGES
Walter P. Barie, Jr., Shaler Township, Allegheny County, Norman W. Franke, Penn Hills Township, Allegheny County, and Stanley C. Paviak, Shaler Township, Allegheny County, Pa., assignors to Gulf Research & Development Company, Pittsburgh, Pa.
No Drawing. Filed Dec. 26, 1968, Ser. No. 787,241
Int. Cl. C08g 20/38
U.S. Cl. 260—78
16 Claims

ABSTRACT OF THE DISCLOSURE

Isomeric monoamine mixtures of the various individual compounds represented by the following formula:

$$CH_3-(CH_2)_x-CH-(CH_2)_Y-CH_3$$
$$|$$
$$M$$

wherein the total number of carbon atoms in the linear paraffin chain is from about 8 to 22; wherein X is a whole number from about 0 to 19 and Y is a whole number from about 0 to 19; and wherein M is a member selected from the group consisting of $NH_2$; acetate and hydrochloride salts of $NH_2$;

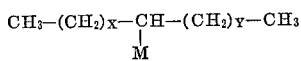

wherein $a$ and $b$ are each greater than zero;

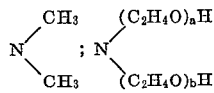

wherein $A^1$, $A^2$, and $A^3$ are selected from the group consisting of hydrogen and $(C_2H_4O)_xH$ where $x$ is one or greater; and

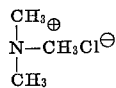

are used as effective antistatic agents for plastics. In practice, these compounds are preferably mixtures of substantially equal amounts of the various monoamine isomers wherein the monoamine is attached to a different internal carbon atom.

This invention relates to antistatic agents for plastic compositions. More particularly, this invention relates to the use of novel antistatic agents which plastics to suppress electrostatic charges thereon.

Many plastic products, especially those of the synthetic resin class, have a tendency to develop electrostatic charges during their formation. The occurrence of these electrostatic charges in plastic products presents a very real problem. Not only do these charges attract dirt and dust to the product, but they tend to cause the product to cling to the processing equipment during manufacture. This clinging often causes shut-down of the machinery as well as weakening of the final product formed. In addition, many products have a tendency to give off annoying shocks and, in certain instances, dangerous sparks.

In order to avert the above problems, the art has proposed many methods for suppressing electrostatic charges in synthetic resins and fibers. For example external methods such as humidity control as well as liquid surface treatment give temporary relief from the above problems. In addition, the art has developed numerous agents, known as internal antistatic agents, which when incorporated within the plastic product rather than just on its surface, reduce the above problems by suppressing the electrostatic charges therein. Internally incorporated antistatic agents are generally preferred over the external agents since the suppressing effects thereof are usually longer lasting.

It is a purpose of this invention to provide the art with various antistatic agents which when used either externally as a surface agent or internally in a plastic, serve to reduce or substantially eliminate the problems heretofore described. In many instances, the antistatic properties of the agents of this invention are superior to those of antistatic agents heretofore used.

Basically, the antistatic agents of this invention may be referred to as monoaminoalkanes and derivatives thereof. More particularly, they are isomeric mixtures of the various individual compounds represented by the formula:

$$CH_3-(CH_2)_x-CH-(CH_2)_Y-CH_3$$
$$|$$
$$M$$

wherein the total number of carbon atoms in the linear paraffin chain is from about 8 to 22; wherein X is a whole number from about 0 to 19 and Y is a whole number from about 0 to 19; and wherein M is a member selected from the group consisting of $NH_2$; acetate and hydrochloride salts of $NH_2$;

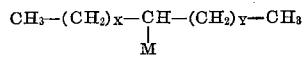

wherein $a$ and $b$ are each greater than zero;

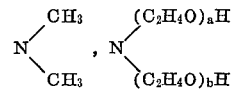

wherein $A^1$, $A^2$, and $A^3$ are selected from the group consisting of hydrogen and $(C_2H_4O)_xH$ where X is one or greater; and

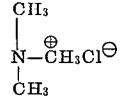

Preferably the linear paraffin chain contains from about 14 to 20 carbon atoms and the sum of $a$ and $b$ is from about 2 to about 15.

By "linear paraffin chain" is meant the straight chain of carbon atoms extending from one $CH_3$ terminal group to the other $CH_3$ terminal group in the above formula and does not include the branched amino group depending internally therefrom. In this respect, it is understood that the number of carbon atoms may, in certain instances, be less than 8 or greater than 22, the criterion being that the compound continue to act as an antistatic agent for polyethylene.

The compounds of this invention, as listed above, are combined with plastics using techniques well known in the art. For example, one preferred technique according to this invention is to dissolve one or more of the above-listed antistatic agents in alcohol and add this solution to plastic pellets. The alcohol is then evaporated and the resulting pellets are for instance, milled on a two roll heated mill to form plastic sheets having the antistatic agent incorporated therein. If sheets are not desired, other types of milling, extruding, fiber drawing or weaving, molding (blow or injection) etc. may be effected to form products other than sheets. When used as an external agent, as another example, the compounds of this invention in alcohol solution may be dipped, sprayed or wiped onto plastic products. Upon evaporation of the alcohol, a surface coating of the antistatic agent is provided.

The antistatic agents of this invention are employed in amounts which are sufficient to suppress the electrostatic charges in the particular product being formed and thereby substantially reduce or eliminate the above-described problems. Governing the amount of agent necessary to effect this end will be many variables such as the type of plastic used, the type of treatment employed to form the plastic into a final product, and the end use to which the final product is put. Generally speaking, the problems arising from electrostatic charges are substantially eliminated if the antistatic agents of this invention are combined with the plastic in amounts of about 1.0 percent to about 0.05 percent and preferably from about 0.5 percent to about 0.1 percent by weight of said plastic.

The plastics contemplated for use in accordance with this invention include substantially all plastics in which the problem of electrostatic charges occurs. Examples of these plastics are the well known synthetic resins and synthetic fibers. Of particular significance are the various polyamide synthetic fibers known as nylon and the polymers and copolymers comprised of the various monomers represented by the grouping:

$$H_2C=C<$$

Examples of these polymers include polyvinyl chloride, polyvinylidene chloride, polystyrene, polymethylmethacrylate, polyethylene, and the like. These polymers and polyamides are of particular significance because of their great versatility in industry and their high propensity for accumulating electrostatic charges. They therefore, constitute a preferred group of plastics according to this invention. In this respect, a particularly preferred polymer for the purposes of this invention is polyethylene. Polyethylene has found numerous uses in industry because of the relative ease with which it may be rolled, shredded, extruded, drawn, injection molded, or blow molded. Because of this extremely high versatility and because of this polymer's propensity for accumulating electrostatic charges, the antistatic agents of this invention are particularly useful when used therewith.

The antistatic agents of this invention may be formulated by various methods. Generally speaking, however, all of the derivatives of the basic monoamine are best formulated by first making the monoamine and then reacting this product with various other materials to obtain the desired derivative.

As stated hereinabove, the monoamine, itself (i.e. the isomeric mixture of the monoamine) is an effective antistatic agent. It may be represented by the formula:

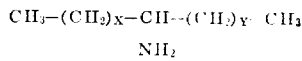

wherein X, Y and the total number of carbon atoms are as defined above. This agent is conveniently produced by reacting a normal paraffin such as from about n-octane to n-docosane, and preferably from n-tetradecane to n-eicosane, with $N_2O_4$. The product of this reaction is found to be a mononitrated paraffin which is actually a substantially uniform mixture of each of the various mononitrated internal carbon atom isomers. The amount of each isomer present in the mixture is usually found to be approximately the same. In addition, the product is found to be substantially free of mononitrated terminal carbon atoms. It is believed that these characteristics of uniformly distributed isomers having no terminal groups, which characteristics are present in the final amine or derivitized amine product, each aid in providing the antistatic characteristics of the compounds of this invention.

This nitrated paraffin product having substantially no terminal nitro groups is then reduced to its amine derivative by reacting the nitro groups with hydrogen. The amine groups so formed, like the nitro groups, are substantially uniformly distributed among the various isomeric internal carbon atoms. There being substantially no terminal amine groups. For example, in the reduction of mononitrated normal $C_{12}$ (dodecane, $C_{12}H_{26}$) paraffin, the isomeric monoamine product mixture contains about 10 percent of the total monoamine groups distributed among each of the internal carbon atoms with substantially no amines on the terminal carbon atoms. That is to say, the product is a substantially uniform isomeric mixture of about 10% 2 carbon atom monoamine, 10% 3 carbon atom monoamine, and so forth up to the 11 carbon atom. Substantially no amine groups are found on the 1 or 12 carbon atom.

The formation of these monoamines may be represented by the following reaction equations:

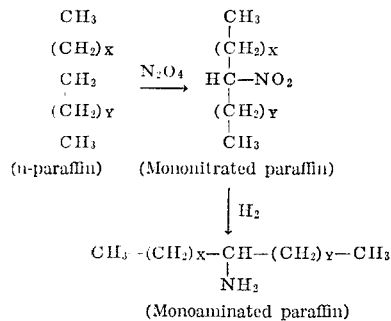

That these isomeric mixtures of internal carbon atom monoamines differ from the terminal amines of the prior art is clearly represented by the following table. This table of cloud point and pour point measurements illustrates the higher fluidity of those monoamines over conventional fatty acid amines having terminal amine groups.

TABLE I.—COMPARISON OF FLUIDITY OF AMINO-ALKANES AND FATTY AMINES

| Amine | Cloud point, ° C. | Pour point, ° C. |
| --- | --- | --- |
| Aminoalkanes:[1] | | |
| $C_{14}$ | −32 | −35 |
| $C_{14-18}$ | −17 | −20 |
| $C_{16}$ | −12 | −15 |
| $C_{20}$ | 16 | 13 |
| Fatty amines: | | |
| Coconut | 19 | 13 |
| Tallow | 63 | 46 |
| $C_{20}$ | | 65 |

[1] Total carbons in paraffin chain.

Using this monoaminated paraffin product, the various derivatives may be formed therefrom.

The acetate salts of the above-described monoaminated paraffins are conveniently produced by adding with stirring a stoichiometric amount of acetic acid to the amine. The reaction with the NH₂ groups of the amine proceeds at room temperature and atmospheric pressure. The product formed is a mixture of the various internal carbon atom acetate salt products are viscous liquids and may be used as antistatic agents.

The anhydrous hydrochloride salts of the above-described monoaminated paraffins are produced by initially dissolving the monoaminated paraffins in a solvent such as pentane. Anhydrous hydrogen chloride is then passed through the solution and the pentane subsequently evaporated. The amine hydrochloride salt product, actually a mixture of the various internal carbon atom monoamine isomers as described above, is initially a fluid but gradually solidifies upon standing.

The dimethyl amine antistatic agents of this invention are represented by the formula:

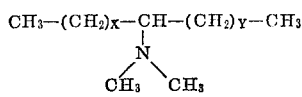

wherein X, Y and the number of carbon atoms in the paraffin chain are the same as defined hereinabove. These compounds, which in practice, are mixtures of the various internally monoaminated carbon atom isomers, are conveniently formed by reacting in a conventional manner, formaldehyde (CH₂O) and hydrogen with the above-described mononitro paraffin product, using a nickel catalyst.

The quaternary ammonium salt antistatic agents of this invention represented by the formula:

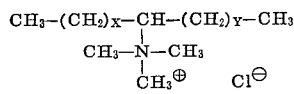

may then be formed by reacting the above dimethylamine product with methylchloride using a suitable solvent. This product, like the other antistatic agents of this invention, is in practice, a mixture of the various monoamine isomers as hereinabove described.

The formulation of the ethoxylated amine compounds useful as antistatic agents in this invention is disclosed in copending application entitled "Ethoxylated Aminoalkanes as Surfactants," by inventors Norman W. Franke, Stanley C. Paviak, and Warren K. Porter, Ser. No. 787,212, filed on even date herewith. The disclosure of this application is incorporated herein by reference.

Generally speaking this copending application discloses the ethoxylation of the above-described monoamines by various two-stage processes. The products formed in either of the two stages of any of the processes therein may be used effectively as antistatic agents for the purposes of this invention. For example, in the first stage or step of one of the processes disclosed therein, about 2 moles of ethylene oxide are charged for each mole of monoamine until all of the amino groups have been reacted, as follows:

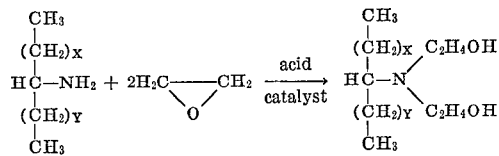

As indicated, this reaction results in a product wherein very little, if any, ethylene oxide polymerization occurs, the product consisting almost entirely of a 2:1 molar ratio of ethylene oxide to amine. This product is an effective antistatic agent.

After all of the ethylene oxide has been reacted, the second stage or step of the process may be effected by reacting the ethoxylated product of stage-one with a further amount of ethylene oxide as follows:

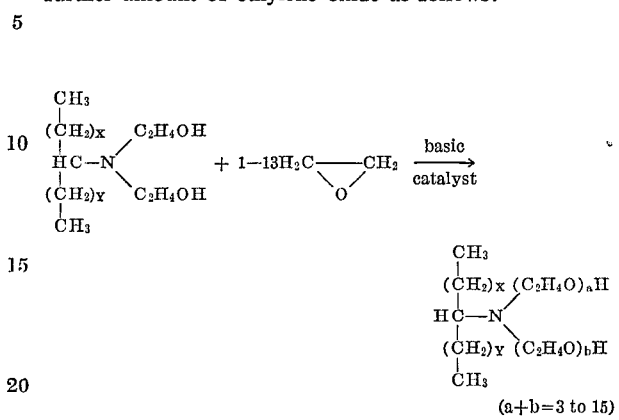

The product so formed, which also constitutes an antistatic agent as contemplated by this invention, is in practice, an isomeric mixture having ethoxylated monoamine groups distributed substantially uniformly among the various internal carbon atoms of the molecules. Preferably the sum of $a$ and $b$ is from about 3 to 15. However, the upper range of the sum of $a$ and $b$ is usually a practical consideration and for most purposes need not exceed about 35.

In practice, the two stage process for ethoxylating monoamine paraffins to form compounds as contemplated by this invention, may be accomplished by using either of two separate techniques. In the first technique, a solution comprising the monoamine as above described, and an inorganic acid catalyst, is initially sparged with nitrogen at about 90° C. to remove water. Into this solution there is added about 2 moles of ethylene oxide per mole of amine. The solution is then held at slightly elevated pressures and at temperatures from 90–100° C. for a sufficient period of time to allow all of the ethylene oxide to condense with the aminoalkane. The product mixture is then neutralized with an inorganic base and the resulting salt removed by organic solvent extraction. The solvent is then removed by vacuum distillation. The product so formed is an ethoxylated aminoalkane as described above having an ethylene oxide to amine molar ratio of about 2:1. Very little, if any further ethylene oxide condensation occurs and the ethoxylated product at this point is substantially water insoluble and may be used as an effective antistatic agent.

To achieve further ethoxylation the product formed in the first stage may next be redissolved with an inorganic basic catalyst such as NaOH. The mixture is then heated to above about 160° C. and ethylene oxide is passed into the solution at slightly elevated pressures whereupon the ethylene oxide polymerizes with the ethoxylate group in the amine. Ethylene oxide addition is continued until the desired degree of condensation (i.e. until the desired sum of $a$ and $b$) is achieved. Generally speaking the preferred sum of $a$ and $b$ is about 3 to 15. The solution is then cooled and neutralized with an inorganic acid and the resulting salt removed by filtration. The final product so formed is found to have an ethoxylated amine segment which is highly water soluble (i.e. hydrophilic).

The second technique for forming ethoxylate antistatic agents according to this invention utilizes the diethanolamine product formed by acid catalysis in the first stage of the above-described first technique, as the catalyst in the first step of this technique. This second technique is usually conducted as follows: A small amount of the diethanolamine is formed by acid catalysis as described above, and collected. This reaction is adequately represented by the following equation:

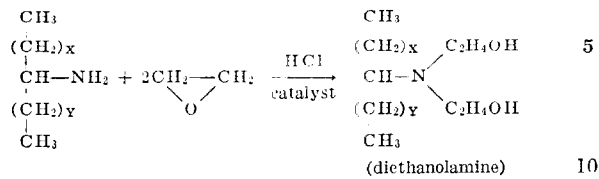
(diethanolamine)

A solution of the monoamine and the diethanolamine is then formulated and sparged with nitrogen at 90° C. To this solution there is added about 3 moles of ethylene oxide per mole of monoamine over a period of about 4 hours, during which time, pressure is held at slightly above atmospheric and temperatures are from about 90–100° C. The reaction mixture is allowed to react for a sufficient period of time to insure that all of the ethylene oxide has reacted. The product of condensation is an ethoxylated amine having an ethylene oxide to amine molar ratio of about 3. This condensation reaction is adequately represented by the following equation:

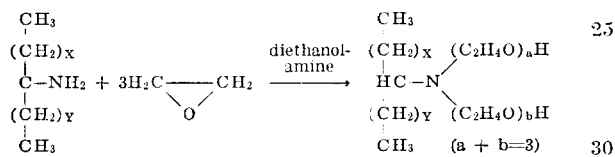

Not only do these compounds, having a molar ratio of about 3, serve as effective antistatic agents, but it has been found in accordance with this invention that these first stage products, having a molar ratio of about 3 and preferably from about 3 to 5, may be used to catalyze their own formation. Therefore, after start-up, the preliminary step of forming a diethanolamine catalyst may be eliminated and a portion of the ethoxylated product recycled as the catalyst.

Because no acid is added in the carrying out of the first step of this technique the second step may be effected without the need for neutralization salt extraction, and solvent removal. This represents a distinct economic advantage over the first technique.

In effecting the second step of this technique if further ethoxylation is desired, there is added to the product solution of the first step which contains an ethoxylated product having a molar ratio of about 3, a small amount of NaOH as a catalyst. This mixture is then heated and ethylene oxide passed into the solution at slightly above atmospheric pressure. The temperature of the solution is raised to about 170° C. and ethylene oxide is added continuously until the desired degree of ethoxylation has occurred. The following equation is illustrative of the reaction which takes place:

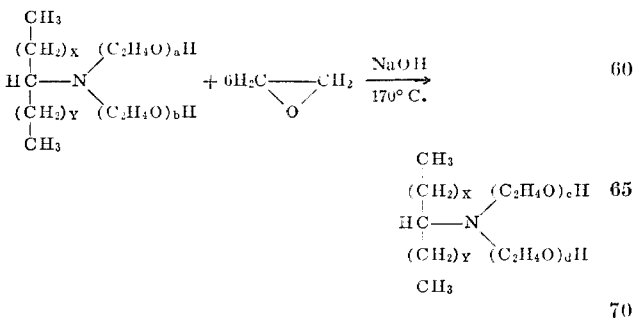

where $a+b=3$ and where $c+d=9$.

The product formed as illustrated has an ethylene oxide to amine molar ratio of 9:1. Other ratios are obtainable by varying the length of reaction time and amount of ethylene oxide in step two.

The trimethylene diamine antistatic agents of the monoamine paraffins described above are represented by the formula:

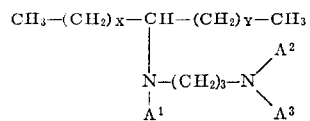

wherein X, Y, and the number of carbon atoms in the pariffin chain are the same as defined above, and wherein $A^1$, $A^2$, and $A^3$ are selected from the group consisting of hydrogen and $(C_2H_4O)_xH$ where $x$ is one or greater.

In those instances where $A^1$, $A^2$, and $A^3$ are hydrogen, the antistatic agent is an unethoxylated trimethylene diamine. The formation of this diamine which is a mixture of the various isomers thereof, is fully disclosed in copending application entitled "Rapid Set Cationic Bituminous Emulsions" by inventors Walter P. Barie, Jr., Stanley C. Paviak, and Norman W. Franke, Ser. No. 787,231, filed on even date herewith. The disclosure of this copending application is incorporated herein by reference.

Generally speaking the unethoxylated trimethylene diamines are formed from the above-described monoamine paraffins by first reacting with acrylonitrile at about 70° C. in an alcohol solvent. The resulting product, a cyanoethylate, is then reduced with hydrogen and a catalyst to form the N-alkyl trimethylene diamine antistatic agent of this invention. These reactions may be adequately represented as follows:

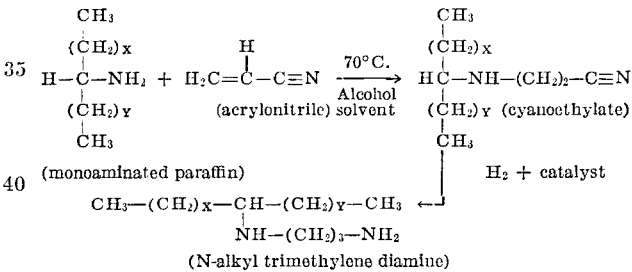
(N-alkyl trimethylene diamine)

The ethoxylated trimethylene diamine antistatic agents, of this invention, which are mixtures of the monoamine isomers thereof, may be formulated according to procedures set forth in copending application entitled "Ethoxylated N-Alkyl Trimethylene Diamines as Medium Set Asphalt Emulsifiers" by inventors Walter P. Barie, Jr., Stanley C. Paviak, Ser. No. 787,232, filed on even date herewith. The disclosure of this application is incorporated herein by reference.

Generally speaking the ethoxylated trimethylene diamines of this invention wherein at least one A and preferably all A's are ethoxy groups made by reacting the above-described unethoxylated trimethylene diamine with ethylene oxide in the presence of catalyst. Such reaction is represented by the following equation:

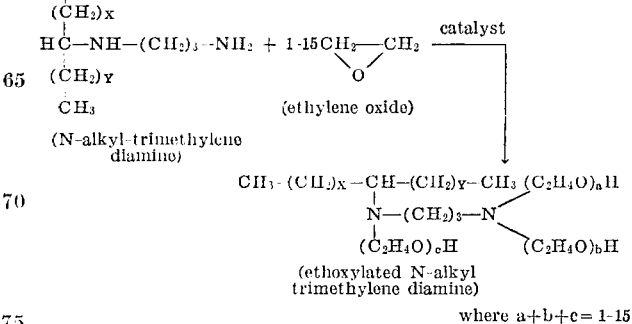
(ethoxylated N-alkyl trimethylene diamine)

where $a+b+c = 1-15$

It is understood, of course, that this equation is only illustrative. In certain instances not all of the amine groups will be wholly or even partially ethoxylated. That is to say, the product formed may be totally made up of ethoxylated amines or in many instances, some mixture and the ethoxylated product consisting totally of wholly or partially ethoxylated amines, are effective antistatic agents for the purposes of this invention.

The catalyst used in the above ethoxylation reaction may be either a low molecular weight alcohol, preferably a secondary alcohol, or recycled ethoxylate. The catalyst and the diamine may be mixed and heated to 100–105° C. under an inert atmosphere and ethylene oxide bubbled through the solution until the amino groups are ethoxylated. If a higher ethylene oxide ratio is desired, a caustic catalyst is added and the temperature is raised to 160° to 180° C. whereupon the addition of ethylene oxide is continued. In this respect the degree of ethoxylation may be regulated and the type product formed thereby controlled.

All of the above-described antistatic agents may be effectively used as external or internal agents in a plastic to suppress electrostatic problems therein. Preferably the antistatic agents of this invention are used as internal agents by conventionally blending these agents into the final product. Most preferably the plastic used is nylon or polyethylene.

The following examples further illustrate the invention and are not intended as limitations thereon.

EXAMPLE 1

Formation of aminoalkane antistatic agent

A paraffin consisting of a mixture of $C_{14}$ to $C_{18}$ paraffins is nitrated using $N_2O_4$ gas and conventional vapor phase reaction techniques. As stated above, such a reaction results in substantially no terminal $NO_2$ groups being formed on the paraffin chain. The nitrated paraffin is then reacted by conventional hydrogenation techniques in suitable pressure hydrogenation apparatus with hydrogen, using a suitable hydrogenation catalyst (e.g. finely divided Ni), a solvent, and superatmospheric pressures. Generally the pressures used are about 600 p.s.i. to about 2000 p.s.i. and the temperatures used are between about 15° C. and 150° C. The product formed, is a substantially uniform mixture of $C_{14-18}$ paraffin monoamine isomers having substantially no terminal amine groups. When using this product to produce the various derivatives thereof, as hereinafter set forth, this characteristic of substantially uniform amounts of isomers appeared in all the derivatives formed therefrom.

EXAMPLE 2

Formation of acetate salt of aminoalkane $C_{14-18}$ aminoalkane (31.6 g.—0.14 mole) was treated with a stoichiometric amount of glacial acetic acid (8.4 g.—0.14 mole). Cooling of the mixture in an ice bath was required. The amine acetate is a yellow liquid, and titration with a standard sodium hydroxide solution showed an equivalent weight of 284 g./mole (theory—286 g./mole).

Formation of hydrochloride salt of aminoalkane $C_{14-18}$ aminoalkane (34.5 g.—0.15 mole) was dissolved in pentane (2–3 volumes) and anhydrous hydrogen chloride passed through the solution for 0.5 hour. The mixture was heated to remove pentane and excess hydrogen chloride. The amine hydrochloride was a yellow viscous oil which upon titration with a standard sodium hydroxide solution showed an equivalent weight of 272 g./mole (theory 262 g./mole).

EXAMPLE 3

Formation of dimethyl aminoalkanes

To the nitrated paraffin prepared in Example 1, there were added 37% aqueous formaldehyde, nickel (Girdler Catalyst 49B) and methanol and the resultant slurry was stirred in an autoclave at a temperature in the range of 40° to 90° C. and a hydrogen pressure of 500 p.s.i.g. for one hour. At the end of this period there was no longer absorption of hydrogen. The contents of the reactor were cooled to room temperature; the pressure released; and the catalyst removed therefrom by filtration. The methanol was stripped from the reaction mixture by heating at a temperature of 64° C. at atmospheric pressure and the residue was treated with water containing hydrocholoric acid. The aqueous solution was extracted with ether and the amine released from its salt with sodium hydroxide. The dimethyl aminoalkanes were purified by distillation.

EXAMPLE 4

Formation of quaternary ammonium salts

A mixture of 144.5 g. (0.61 mole) of N,N-dimethylaminotetradecane formed in accordance with the process of Example 3, 15 g. of sodium bicarbonate, and 160 g. of 50% aqueous isopropanol was charged to a one-liter stirred autoclave. Methyl chloride (33 g., 0.66 mole) was then pressured into the autoclave. After 5.5 hours at 70° C., 99% of the amine was converted. The autoclave was cooled and then drained of product. The mixture was filtered to remove salts and the final product, a quaternary ammonium salt, was collected.

EXAMPLE 5

Formation of ethoxylated aminoalkane

A solution of 180 g. (0.75 mole) of the above $C_{14-18}$ paraffin monoamine formed in Example 1 and 8.3 ml. of 36% HCl is sparged with nitrogen at 90° C. to remove water. Over a four-hour period at a pressure slightly greater than atmospheric 63 g. (1.43 moles) of ethylene oxide was condensed with the amine. The final ethylene oxide to amine molar ratio was 1.9:1. The product solution was neutralized with NaOH, and the sodium chloride salt formed thereby was removed by dissolving it in hexane and extracting it with a saturated solution of sodium sulfate. Isopropanol was added to the hexane solution and this mixture was filtered to remove sodium sulfate. The solvents were then removed by vacuum distillation to recover an ethoxylated amine having a molar ratio of 1.9:1 which for all practical purposes, may be considered substantially 2:1.

This ethoxylated product was further ethoxylated by redissolving 66 g. (0.2 mole) of it with 0.25 g. of NaOH. This solution was heated and ethylene oxide passed into the solution at slightly above atmospheric pressure. After 2⅔ hours at a temperature of about 170° C., 43 g. (0.98 mole) of ethylene oxide had been condensed. After cooling, the catalyst was neutralized with the addition of dilute sulfuric acid. The product, which has an ethylene oxide to amine molar ratio of 6.9:1 was filtered to remove sodium sulfate.

Both of the above ethoxylated aminoalkanes were found to be effective antistatic agents.

EXAMPLE 6

Formation of N-alkyl trimethylene diamines

The monoamine product of Example 1 is combined with acrylonitrile at a molar ratio of 1:1.5 in approximately an equal volume of 95% ethanol solvent in a reaction vessel. The solution is stirred mechanically and heated to 75° C. Under these conditions the reaction of the aminoalkanes is completed in 0.25 to 2 hours and thereby forms a cyanoethylate. The progress of the reaction may be followed by monitoring unreacted amine using gas chromatography. The excess acrylonitrile and solvent are removed from the product by distillation at reduced pressure.

The reduction of the cyanoethylated product to its corresponding trimethylene diamine is performed in a stirred autoclave (e.g. 300 ml.) which has been fitted with an external heating coil. Approximately 60 parts by weight (e.g. 60 g.) of cyanoethylated aminoalkane is put into the autoclave with 2.5 parts by weight (e.g. 2.5 g.) of a suitable catalyst (e.g. Ni on kieselguhr, Girdler 49B, 49A, and the like) and a sufficient volume of methanol to form a solution (e.g. 100 ml.). Ammonia is added quickly and without stirring of the solution at a pressure of 100 p.s.i.g. for 45 seconds. The addition of ammonia is then stopped, and upon stirring the solution, the pressure drops to below 50 p.s.i.g. The presence of ammonia is desirable in order to suppress the formation of undesirable secondary amine products.

Hydrogen is next added while stirring (e.g. 250–300 r.p.m.) the solution over a period of 0.5 hour until the total pressure is approximately 1500 p.s.i.g. and maintained at this level. The autoclave is heated to 135–140° C. and held at this temperature. The end of the reaction is detected by the failure of the solution to absorb more hydrogen. The completion of the reaction is reached in 2 to 20 minutes after reaching reaction conditions. The autoclave is then cooled to room temperature, stirring is discontinued, pressure is reduced to atmospheric, and the solution drained. The catalyst is separated by filtration and the solvent is removed from the product by distillation at about 25° C. and 100 mm. Hg pressure.

The product is next flash distilled and further purified by fractional distillation at approximately 1 mm. Hg pressure. The N-alkyl trimethylene diamines are prepared at 55–65% conversion and 90–95% efficiency per single pass. The recovered amine, which results from the decomposition of the diamine product, can be recycled if desired. It is an effective antistatic agent for plastics.

EXAMPLE 7

Formation of ethoxylated N-alkyl trimethylene diamines 20 g. (0.068 mole) of the trimethylene diamine of aminohexadecane produced according to the procedure in Example 6 were mixed with 3 g. of sec-butyl alcohol. The solution was heated to 100° C. under a nitrogen atmosphere. Over a four hour period 9 g. (0.204 mole) of ethylene oxide were consumed giving a final product having a 3:1 ethylene oxide to amine molar ratio. The alcohol was removed by vacuum stripping and the ethoxylated hexadecane trimethylene diamine collected and dried to final product form. This final product is found to be an effective antistatic agent.

EXAMPLE 8

In order to illustrate the effectiveness of the antistatic agents of this invention $C_{14}$, $C_{14-18}$, $C_{16}$ and $C_{20}$ monamine paraffins (substantial uniform isomeric mixtures thereof) and several of their derivatives were prepared using the procedures of the above examples. These agents were then compared for their ability to suppress electrostatic charges in polyethylene with several currently used antistatic agents as indicated by composition (e.g. N—$C_n$ etc.) and at times by tradename. The comparison was made by milling the antistatic agent into a low density polyethylene at 0.5% by weight polyethylene. The conductivity of the surface of a pressed specimen was determined at room temperature and 48% relative humidity with a Keithley No. 6105 resistivity adapter attached to 610R Keithley Electrometer powered by a Keithley Model 240 high voltage supply. The values were converted to the logarithm of the surface resistivity. The results are as follows:

TABLE I.—SURFACE RESISTIVITIES OF POLYETHYLENE CONTAINING AMINE DERIVATIVES

| Antistatic agent (0.5%) | Log R (ohms/square at 73±2° F. and 48±2% R.H.)[1] | |
|---|---|---|
| | Initial | After 1 hour water immersion |
| None | >14 | |
| Amines: | | |
| $C_{14-18}$ aminoalkane [2] | 9.2 | 12.2 |
| $C_{20}$ aminoalkane [2] | 11.6 | 12.3 |
| $C_{14-18}$ aminoalkane, dimethyl [2] | 10.7 | 10.8 |
| N-$C_{14}$ aminoalkane trimethylene diamine [2] | 9.9 | 10.2 |
| N-$C_{14-18}$ aminoalkane trimethylene diamine [2] | 10.1 | 10.7 |
| N-$C_{16}$ aminoalkane trimethylene diamine [2] | 9.5 | 10.8 |
| N-$C_{20}$ aminoalkane trimethylene diamine [2] | 9.8 | 11.0 |
| Amine 100 (Richardson Co.) | 12.2 | |
| Coco amine, dimethyl (Armeen DNCD) | 9.6 | 10.1 |
| Tallow amine, dimethyl (Armeen DMHTD) | 12.0 | 12.1 |
| Ethoxylated amines (molar ratio):[3] | | |
| $C_{14}$ aminoalkane (2.0)[2] | 9.8 | 10.5 |
| $C_{14}$ aminoalkane (9.0)[2] | 10.3 | 10.7 |
| $C_{14-18}$ aminoalkane (1.9)[2] | 10.2 | 10.7 |
| $C_{14-18}$ aminoalkane (6.9)[2] | 9.8 | 10.2 |
| $C_{14-18}$ aminoalkane (13.1)[2] | 10.1 | 10.5 |
| $C_{20}$ aminoalkane (10.9)[2] | 9.6 | 10.4 |
| $C_{20}$ aminoalkane (13.0)[2] | 9.8 | 11.5 |
| N-$C_{14}$ aminoalkane trimethylene diamine (3.3)[2] | 9.7 | 10.2 |
| n-Octadecylamine (Ethomeen 18/20) (10.0)[2] | 10.4 | 11.6 |
| Quaternary ammonium chloride: | | |
| $C_{14}$ aminoalkane, trimethyl [2] | 9.5 | 10.5 |
| $C_{16}$ aminoalkane, trimethyl [2] | 9.6 | 11.6 |
| $C_{16}$ aminoalkane, dimethyl benzyl [2] | 10.1 | 11.6 |
| $C_{20}$ aminoalkane, trimethyl [2] | 10.4 | 13.3 |
| Stearamido propyldimethyl-B-hydroxyethyl ammonium nitrate (Catanac SN) | 10.6 | 13.4 |
| Tallow trimethyl (Arquad T) | 8.9 | 13.8 |
| Salts: | | |
| $C_{14-18}$ aminoalkane acetate [2] | 11.0 | 11.2 |
| $C_{14-18}$ aminoalkane hydrochloride [2] | 10.3 | 12.1 |

[1] Values should be considered as follows: excellent (<10), good (10–11), fair (11–12) and poor (>12).
[2] Compounds according to this invention. For convenience they are referred to as aminoalkanes. In reality they are a uniform isometric mixture as herein above described.
[3] The aminoalkanes listed from $C_{14}$ to $C_{20}$ are ethoxylated amines wherein M is

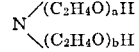

and the sum of $a+b$ is indicated in parentheses.

The results listed in this table are self-explanatory to one skilled in the art. All of the antistatic agents of this invention tested can be used as effective antistatic agents in polyethylene. In addition, the compounds of this invention prove more effective in lowering the resistivity than a well known antistatic agent (Catanac SN) and ones derived from naturally occurring tallow. With respect to the ethoxylated amines, the antistatic quality is relatively independent of the ethylene oxide content and superior to a conventional n-octadecylamine ethoxylate in that they are not as readily leached from the plastic. With the cationic quaternary ammonium chloride, the resistivity is increased after water immersion, which is probably due to the fact that the additive is leached out to some degree, but not to the degree of a tallow derivative.

EXAMPLE 9

In order to further illustrate the properties of the compounds of this invention the quaternary ammonium chlorides and ethoxylates thereof are compared with well known antistatic agents using a typical nylon fabric as the substrate. The nylon fabric was immersed in 0.5, 0.2, and 0.1% solution of the agents and their resistivities measured in accordance with the procedure of Example 8 under normal conditions (50% relative humidity) and the more severe conditions of low humidity (about 25%). The results are listed as follows:

TABLE II.—SURFACE RESISTIVITIES OF NYLON TREATED WITH AMINE DERIVATIVES

| | Log R (ohms/square at room temperature [1]) | | | | | |
|---|---|---|---|---|---|---|
| Additive in solution (percent) | 0.5 | | 0.2 | | 0.1 | |
| Relative humidity (percent) | 50 | 25 | 50 | 25 | 50 | 25 |
| Salt: | | | | | | |
| $C_{14-18}$ aminoalkane hydrochloride [2] | 11.1 | 12.3 | 12.1 | 13.3 | 12.9 | 14.3 |
| Quaternary ammonium chlorides: | | | | | | |
| $C_{16}$ aminoalkane, trimethyl [2] | 8.4 | 11.2 | 9.1 | 11.7 | 10.2 | 12.7 |
| $C_{16}$ aminoalkane, benzyldimethyl [2] | 9.9 | 12.0 | 10.9 | 12.9 | 11.6 | 13.3 |
| Coco, trimethyl (Arquad C-50) | 8.1 | 10.3 | 9.7 | 11.9 | 10.5 | 12.9 |
| Tallow, trimethyl (Arquad T-50) | 8.4 | 10.8 | 8.9 | 11.2 | 10.2 | 13.0 |
| Diisobutyl phenoxy ethoxy ethyl dimethylbenzyl ammonium chloride (Hyamine 1622) | 13.3 | 15.6 | 11.0 | 14.1 | 11.5 | 14.2 |
| Stearamido propyldimethyl-β-hydroxyethyl ammonium nitrate (Catanac SN) | 9.1 | 11.2 | 10.1 | 12.4 | 10.9 | 13.3 |
| Methyl diethoxy coco ammonium chloride (Arquad C/12) | | 10.3 | | 11.6 | | 12.6 |
| Ethoxylates (molar ratio ethylene oxide to amine): | | | | | | |
| $C_{16}$ aminoalkane (7.6) [2] | 11.2 | 11.8 | 11.8 | 12.3 | 12.3 | 12.7 |
| $C_{16}$ aminoalkane (11.0) [2] | 11.1 | 11.4 | 11.6 | 11.8 | 12.4 | 12.8 |
| Coco amine (5.0) (Ethomeen C/15) | 11.2 | 11.5 | 12.0 | 12.4 | 12.4 | 13.1 |
| Coco amine (10.0) (Ethomeen C/20) | 10.5 | 11.9 | 11.8 | 12.6 | 12.4 | 13.7 |
| Tallow trimethylene diamine (10.0) (Ethoduomeen T/20) | 11.4 | 12.9 | 12.5 | 13.9 | 13.5 | 14.6 |

[1] Values should be considered as follows: excellent (<10), good (10–11), fair (11–12) and poor (>12).
[2] Compounds according to this invention.

Of the compounds of this invention, the quaternary ammonium salts exhibited the best suppressing capabilities followed by the ethoxylated amines. Effectiveness naturally decreases with decreasing concentration and also with a reduction in humidity. Trimethyl $C_{16}$ alkane ammonium chloride was better than its benzyldimethyl analogue, and about comparable to other quaternaries from fatty amines. Ethoxylated $C_{16}$ amino alkanes of this invention are acceptable antistatic agents and are as good as conventional ethoxylated amines. Though the ethoxylates of this invention have a lower order of effectiveness than the quaternaries, their resistivities do not increase as much as the lower humidity.

EXAMPLE 10

Five aminoalkanes, $C_{14}$, $C_{15}$, $C_{16}$, $C_{17}$ and $C_{18}$ were prepared in accordance with Example 1 and their isomer distribution measured and averaged. Measurement of the isomeric mixture of each individual alkane was conducted by converting to their cyclohexyl imine derivatives and analyzing according to conventional gas chromatographic techniques with the following results after averaging all five compound measurements together.

Amine isomer [a] (carbon atom No.): Percent isomer
2 ----------------------------------------- 11
3 ----------------------------------------- 13
4 ----------------------------------------- 14
5 ----------------------------------------- 13
6, 7, 8 and 9 ----------------------------- 48

[a] No distinction is made between the 2 carbon atom and the 13 carbon atom for example in $C_{14}$ or the 14 carbon atom, as another example in $C_{15}$. Both isomers are listed together and are called the 2 carbon atom. The percent value, therefore, indicated the total percent of both symmetrical carbon atoms. the same is true with respect to the other symmetrical carbon atoms.

As can be seen, the compounds of this invention are substantially uniform mixtures of the various amine isomers thereof.

Many modifications, variations, and other features of this invention will become apparent to the skilled artisan once given the above disclosure. Such modifications, variations, and other features are therefore considered a part of this invention, the scope of which is to be determined by the following appended claims.

We claim:
1. A composition of matter consisting essentially of a plastic having a propensity for accumulating electrostatic charges and about 1.0 percent to about 0.05 percent by weight of said plastic, a mixture of the monoamine isomers of a compound represented by the formula:

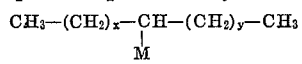

wherein the total number of carbon atoms in the linear paraffin chain is from about 8 to 22; wherein $x$ is a whole number from about 0 to 19 and $y$ is a whole number from about 0 to 19; and wherein M is a member selected from the group consisting of —$NH_2$; acetate and hydrochloride salts of —$NH_2$;

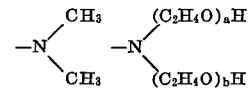

wherein $a$ and $b$ are each greater than zero;

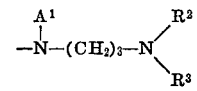

wherein $A^1$, $A^2$, and $A^3$ are are selected from the group consisting of hydrogen and $(C_2H_4O)_xH$ where $x$ is one or greater; and

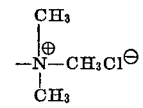

2. A composition according to claim 1 wherein said compound is present in an amount of about 0.5 percent to about 0.1 percent by weight of said plastic.
3. A composition according to claim 1 wherein said compound is an external antistatic agent for said plastic.
4. A composition according to claim 1 wherein said compound is an internal antistatic agent for said plastic.
5. A composition according to claim 1 wherein said plastic is polyethylene.
6. A composition according to claim 1 wherein said plastic is polycarbonamide.
7. A composition according to claim 1 wherein the number of carbon atoms in the paraffin is 14 to 20.
8. A composition according to claim 1 wherein M is

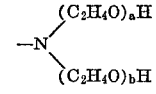

and the sum of $a$ and $b$ is about 2 to about 15.
9. A composition according to claim 1 wherein said compound contains substantially no terminal amine groups.
10. A composition according to claim 1 wherein said mixture contains substantially the same amount of each isomer.
11. A composition according to claim 10 wherein M is —$NH_2$.
12. A composition according to claim 10 wherein M is an acetate salt of —$NH_2$.

13. A composition according to claim 10 wherein M is

14. A composition according to claim 10 wherein M is

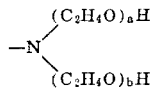

and $a$ and $b$ are each greater than zero.

15. A composition according to claim 10 wherein M is

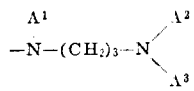

and $A^1$, $A^2$, and $A^3$ are selected from the group consisting of hydrogen and $(C_2H_4O)_x$ where $x$ is one or greater consisting of hydrogen and $(C_2H_4O)_xH$ where $x$ is one or greater.

16. A composition according to claim 10 wherein M is

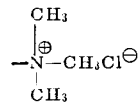

References Cited
UNITED STATES PATENTS

| | | | |
|---|---|---|---|
| 2,624,725 | 1/1953 | Bjorksten et al. | 260—78 |
| 2,848,413 | 8/1958 | Schuller | 260—78 |
| 3,190,763 | 6/1965 | Schleede et al. | 260—78 |
| 3,324,091 | 6/1967 | Savides | 260—78 |
| 3,445,396 | 5/1969 | Funatsu et al. | 260—78 |
| 3,338,967 | 8/1967 | Potts et al. | 260—583 |
| 3,398,197 | 8/1968 | Miller et al. | 260—583 |

HAROLD D. ANDERSON, Primary Examiner

U.S. Cl. X.R.

117—161; 252—182; 260—89.5, 92.8, 93.5, 94.9, 583

PO-1050
(5/69)

UNITED STATES PATENT OFFICE
CERTIFICATE OF CORRECTION

Patent No. 3,591,563      Dated July 6, 1971

Inventor(s) Walter P. Barie, Jr., Norman W. Franke and Stanley C. Paviak

It is certified that error appears in the above-identified patent and that said Letters Patent are hereby corrected as shown below:

Column 5, between lines 3 and 4, insert

--isomers of monoamino-acetate. Generally, speaking these--.

Claim 1, column 14, line 34,

" 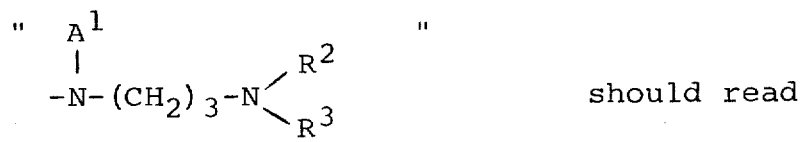 "  should read

-- 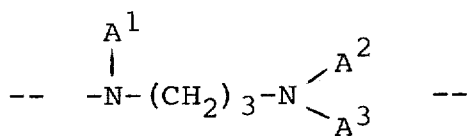 --

Signed and sealed this 29th day of February 1972.

(SEAL)
Attest:

EDWARD M. FLETCHER, JR.
Attesting Officer

ROBERT GOTTSCHALK
Commissioner of Patents